United States Patent [19]

Takeda et al.

[11] 4,353,097

[45] Oct. 5, 1982

[54] FACSIMILE APPARATUS

[75] Inventors: Takashi Takeda, Higashimurayama; Minoru Ogata, Yokohama; Sadasuke Kurabayashi, Asaka, all of Japan

[73] Assignee: Canon Kabushiki Kaisha, Tokyo, Japan

[21] Appl. No.: 199,530

[22] Filed: Oct. 22, 1980

[30] Foreign Application Priority Data

Oct. 29, 1979 [JP] Japan ............................... 54-140039
Oct. 29, 1979 [JP] Japan ............................... 54-140040
Oct. 29, 1979 [JP] Japan ............................... 54-140041

[51] Int. Cl.³ .......................... H04N 1/32; H04N 1/42
[52] U.S. Cl. .................................. 358/287; 179/2 DP; 358/257
[58] Field of Search ...................... 358/287, 257, 256; 179/2 DP

[56] References Cited

U.S. PATENT DOCUMENTS 3,526,709  9/1970  Butterworth ...................... 358/260
3,603,727  9/1971  Kinugawa .......................... 358/287
4,054,914 10/1977  Fukuoka ............................ 358/287
4,086,443  4/1978  Gorham ............................. 358/257
4,268,872  5/1981  Kokaji ................................ 358/287

Primary Examiner—Howard Britton
Attorney, Agent, or Firm—Fitzpatrick, Cella, Harper & Scinto

[57] ABSTRACT

The facsimile apparatus of the present invention is featured, by the functions of selecting transmission modes of picture signals according to a receiving mode informed of from a called party, for example, of transmitting picture signals representative of a picture reduced in size in case an original documents is larger in size than a recording sheet of paper of activating, in case a called machine is in a automatic reception mode, an acoustic output device incorporated in the called machine through a preliminary telephone talk function to request telephone talk with a called subscriber; and of maintaining a transmission line in its active state to call a called subscriber after transmission of picture signals in case a telephone talk is reserved or, otherwise, releasing the connection after transmission of picture signals in case a telephone talk is not reversed.

The above-mentioned functions may be incorporated into a certain transmission protocol thereby accomplishing communication compatibility with other transmission-reception modes of picture signals.

14 Claims, 6 Drawing Figures

FACSIMILE APPARATUS

BACKGROUND OF THE INVENTION

1. Field of the Invention

The present invention relates to a facsimile apparatus having communication compatibility with a transmission-reception mode informed of from another apparatus interconnected thereto.

2. Description of the Prior Art

Facsimile apparatus are classified into high-speed machines, middle-speed machines etc., according to the time period required for transmission. For example, for the middle-speed machines the GII Standard regulated by CCITT (The International Telegraph and Telephone Consultative Committee) recites the use of A-4 size for an original document picture to be transmitted and for recording paper. For this reason larger originals, for example, of B-4 size, cannot be handled by the GII standard apparatus though such larger originals may frequently be encountered. Also some conventional facsimile apparatus have a function of automatic picture reception without manual operation. Such pictures automatically received may not however be noticed by the attendant of the receiving unit and information requiring urgent responsive may not therefore be handled properly, because the receiving subscriber cannot be called by the calling party by way of preliminary telephone talk before picture transmission where the receiving apparatus is in such an automatic reception mode. Also for the purpose of communicating the conditions of a received picture after the picture transmission, the telephone handset may often be left off-hooked after the picture transmission for maintaining the telephone line in its connected state, but the operator may sometimes have forgotten such off-hook as telephone talk request cannot be reserved or memorized in advance. Although such situation may seem rather strange, the attendant of the apparatus may in fact forget the off-hooked handset because of other jobs which may be made during a period of several minutes after the start of picture transmission.

FIG. 1(a) indicates the tonal signals emitted by the transmitter and the receiver according to the aforementioned GII Standard.

In FIGS. 1(a) to 1(d) the line L is the time axis from top to bottom, and the tonal signals emitted from the transmitter and from the receiver are respectively indicated at the left and right sides of the line L. The frequency and duration of each of the signals CED (called station identification), GI II (group identification II; for confirming GII apparatus), GCII (group command II; for designating GII apparatus), LCS (line conditioning signal), PH (phase signals), CFRII (confirmation to receive II; for confirming the preparation for reception), PIX (picture signals), EOM (end of message), MCFII (message confirmation II; for confirming the message in GII Standard), and GI II (mentioned above) are summarized in the following Table I:

TABLE I

|  | Frequency | Duration |  | Frequency | Duration |
|---|---|---|---|---|---|
| CED | 2100 Hz | 3 sec | CFR II | 1650 Hz | 3 sec |
| GI II | 1850 | 1.5 | PIX | 2100 (carrier) | ca. 180 |
| LCS | 1100 | 1.5 | MCF II | 1650 | 3 |
| PH | 2100 | 6 |  |  |  |

SUMMARY OF THE INVENTION

A first object of the present invention is to provide a facsimile apparatus capable of selecting transmission-reception modes in response to a transmission-reception mode of another apparatus interconnected thereto.

A second object of the present invention is to provide a facsimile apparatus capable of calling a receiving subscriber by the preliminary telephone talk request function in case the receiving apparatus is in the automatic reception mode.

A third object of the present invention is to provide a facsimile apparatus capable of maintaining a communication line in its connected state after picture transmission by a talk request reservation function.

A fourth object of the present invention is to provide a facsimile apparatus capable of releasing a connection after picture transmission in case such talk request reservation is not made.

A fifth object of the present invention is to provide a facsimile apparatus having communication compatibility with other transmission-reception modes for picture transmission.

BRIEF DESCRIPTION OF THE DRAWINGS

The present invention will be clarified in more detail by the following description to be taken in conjunction with the attached drawings, in which.

DESCRIPTION OF THE PREFERRED EMBODIMENTS

Figure 1:
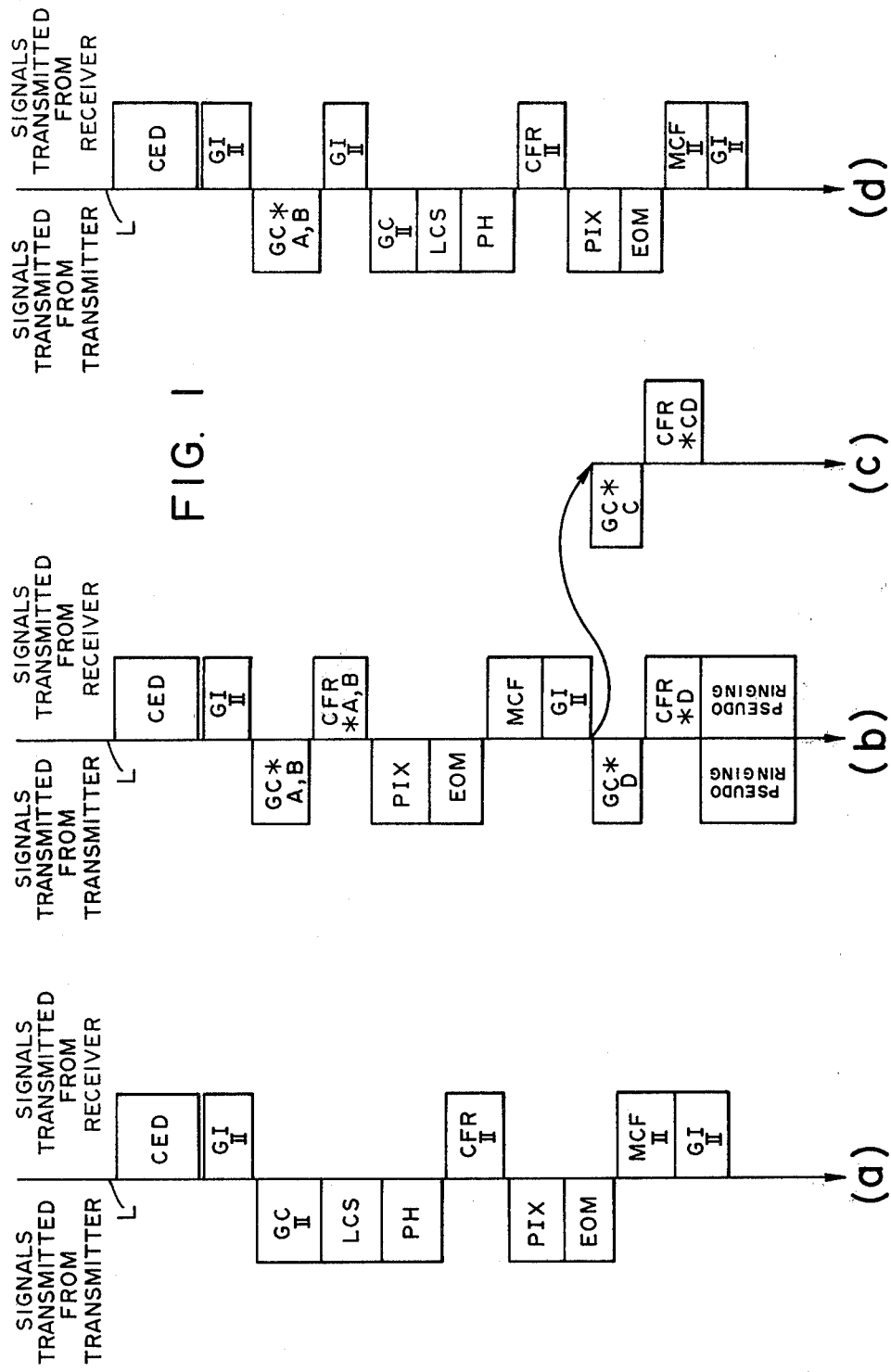
FIG. 1(a) is a signal diagram showing the exchange of tonal signals in case the transmitter and the receiver are both GII apparatus.
FIG. 1(b) is a signal diagram showing the exchange of tonal signals in case the transmitter and the receiver are both apparatus of the present invention and a telephone talk is made after the picture signal transmission.
FIG. 1(c) is a signal diagram showing the exchange of tonal signals in case the transmitter and the receiver are both apparatus of the present invention and the communication connection is released in a normal manner after the picture signal transmission.
FIG. 1(d) is a signal diagram showing the exchange of tonal signals in case the receiver is a GII apparatus.

FIG. 1(b) is a signal flow showing the exchange of the tonal signals in case the transmitter and the receiver are both the apparatus of the present invention and a telephone talk request is reserved after the picture signal transmission. In such a case, the receiver at first transmits the signal CED and then the signal GI II indicating a first receiving mode, in response to which the transmitter emits a signal GC*A,B indicating whether the original document is of A-4 size or B-4 size. Then the receiver sends a signal CFR*A,B indicating whether the recording paper sheet is of A-4 size or B-4 size, upon receipt of which the transmitter identifies that the receiver is an apparatus of the present invention and emits the signals PIX and EOM. In case a telephone talk request key 10 (FIG. 2A) is actuated for reserving a telephone talk, the transmitter then transmits, after receipt of signals MCF and GI II, a signal GC*D requesting a telephone talk, in response to which the receiver transmits a signal CFR*D likewise requesting a telephone talk, whereby pseudo ringing is generated from the loudspeakers, or tone ringers, provided in the transmitter and the receiver as will be explained later. In the above-explained procedure, the transmitter tramsmits the picture signals for A-4 size in case the original document is of A-4 size the recording paper is of A-4 or B-4 size; transmits the picture signals converted from B-4 size into A-4 size in case the original is of B-4 size the recording paper is of A-4 size; and transmits the picture signals of B-4 size in case the original and the recording paper are both of B-4 size.

FIG. 1(c) is a flow diagram showing the exchange of tonal signals in case the transmitter and the receiver are both the apparatus of the present invention and the connection is released in a normal manner after the picture signal transmission, wherein the signal exchange preceding the signal GC*D from the transmitter is the same as that shown in FIG. 1(b) and is therefore omitted for simplicity. In the procedure shown in FIG. 1(c), upon receipt of the signals MCF and GI II from the receiver as shown in FIG. 1(b), the transmitter sends a signal GC*D indicating the normal termination, the signal being produced in the case of the absence of signal GC*A or GC*B indicating the original size or signal GC*D indicating the telephone talk reservation. In succession the receiver emits a signal CFR*C for normal termination to terminate the tonal signal exchange, or a signal CFR*D requesting a telephone talk by sending the above-mentioned pseudo ringing signals.

FIG. 1(d) is a signal diagram showing the exchange of tonal signals in case the transmitter is a facsimile apparatus of the present invention and the receiver is a conventional GIII standard apparatus. In this case the receiver at first produces the signal CED and then the signal GI II, in response to which the transmitter transmits the aforementioned signal GC*A,B. Then the receiver transmits the signal GI II, upon receipt of which the transmitter identifies that the receiver is a conventional GII apparatus to produce the signals GCII, LCS and PH. Thereafter the exchange of tonal signals is conducted in the same manner as between the GII apparatus shown in FIG. 1(a).

Figure 2A:
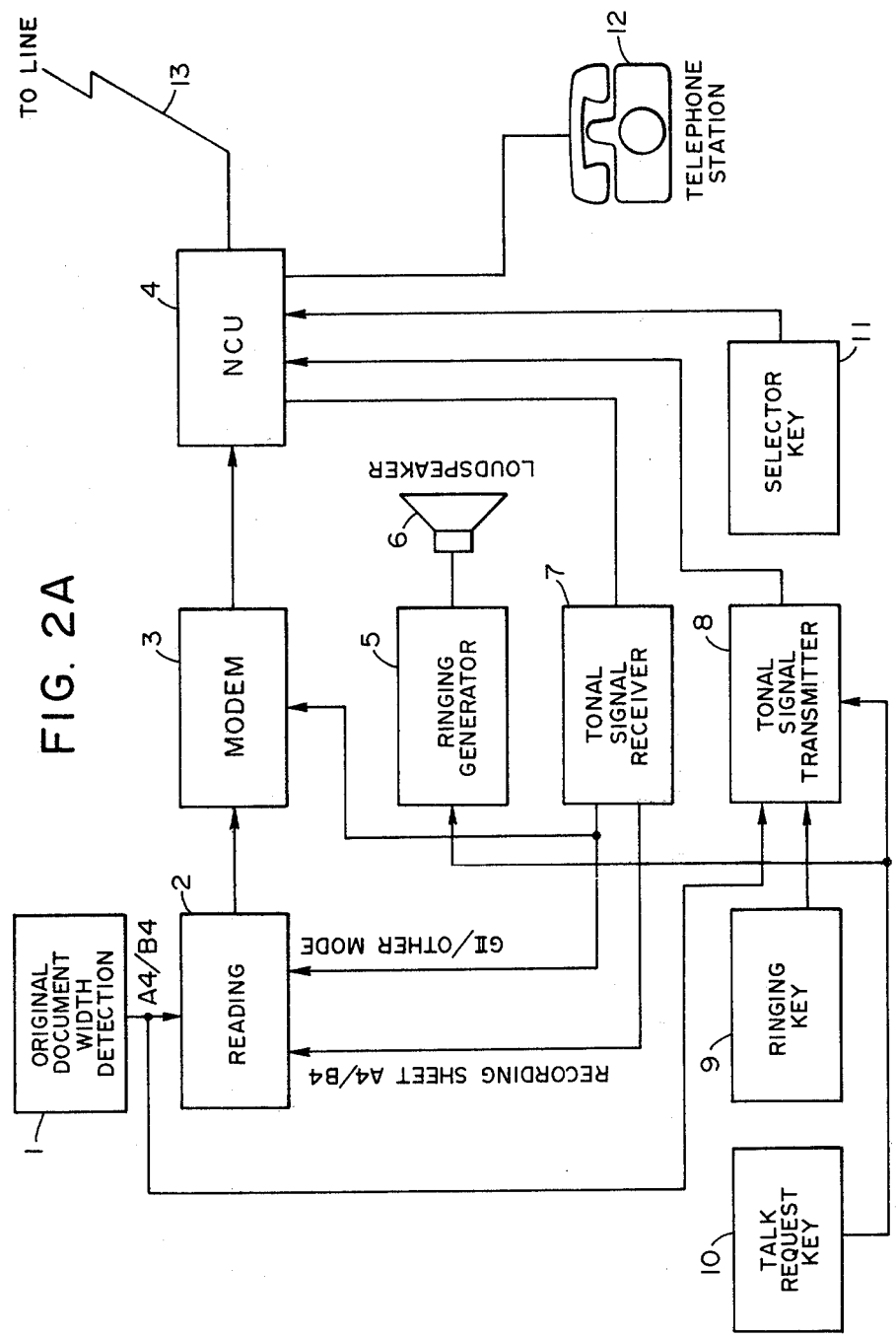
FIG. 2A is a block diagram of a transmitter in the facsimile apparatus of the present invention.
Figure 2B:
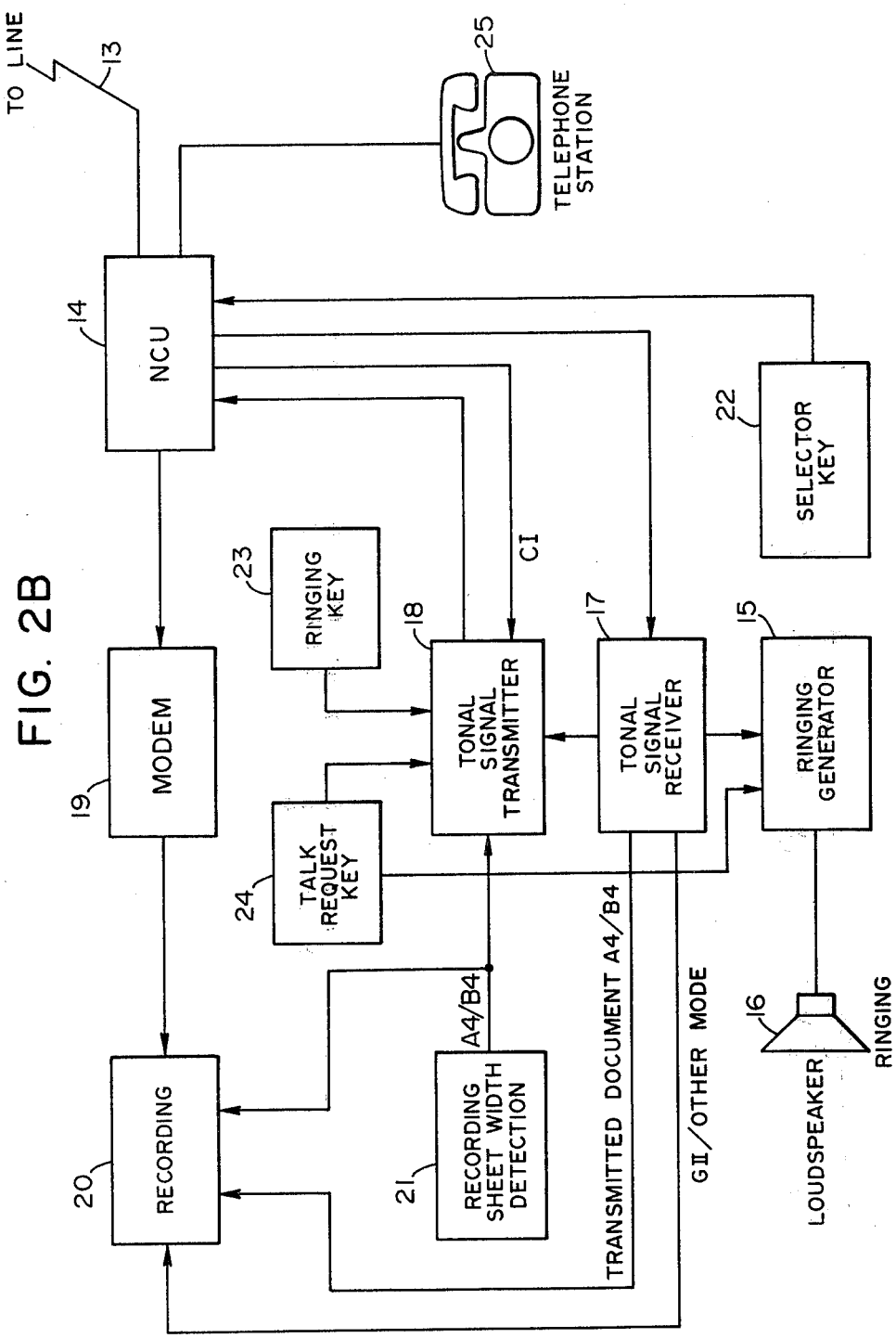
FIG. 2B is a block diagram of a receiver in the facsimile apparatus of the present invention.

FIGS. 2A and 2B show an embodiment of the facsimile apparatus in accordance with the present invention in block diagrams respectively of the transmitter and receiver circuits. In FIG. 2A there are shown an original document width detection circuit 1, a reading circuit 2 for reading the picture information on the original document, a MODEM (modulator and demodulator) 3, an NCU (network control unit) 4 for interfacing the apparatus with the telephone line, a ringing generator 5, loudspeaker 6, tonal signal receiver 7, a tonal signal transmitter 8 for tonal signal generation and transmission, a ringing key 9 for calling an operator of the receiving apparatus, a talk request key 10 for reserving a telephone talk request after picture signal transmission, a selector key 11 for switching the telephone line to the facsimile apparatus for picture signal transmittion or to the telephone station for telephone conversation, a telephone station 12 and a telephone line 13. In FIG. 2B there are shown an NCU 14, a ringing generator 15, a loudspeaker 16, a tonal signal receiver 17, a tonal signal transmitter 18, a MODEM 19, a recording unit 20 for recording a reproduced picture according to the received picture signals, a recording sheet width detection circuit 21, a selector switch 22, a ringing key 23, a telephone talk request key 24 and a telephone station 25. Now the procedure of transmission will be discussed in the order shown in FIG. 1(b) while making reference to the block diagrams shown in FIGS. 2A and 2B.

At first, in response to a call from the telephone station 12, the receiver party is called over the telephone line 13, whereby the NCU 14 generates a calling indicator signal CI and transfers the signal to the tonal signal transmitter 18, in case the receiver is in the automatic reception mode. In response to that signal the tonal signal transmitter 18 produces the called station identification signal CED and the group identification signal II GI II, in succession to the telephone line 13 through the NCU 14, the signals being received, at the transmitter, by the tonal signal receiver 7 through the NCU 4. Thereafter the original document width detection circuit 1 emits a signal indicating whether the original document is of A-4 or B-4 size to the reading circuit 2 and to the tonal signal transmitter 8, which then transmits the tonal signal GC*A or GC*B shown in FIG. 1(b) over the telephone line 13 through the NCU 4.

The aforementioned tonal signals GC*, including GC*A to GC*D, and the tonal signals CFR*, including CFR*A to CFR*D, to be explained later have the following meaning, frequency and duration as summarized in Table 2:

TABLE 2

| Signal | Meaning | 0.5 sec | 0.5 sec |
| --- | --- | --- | --- |
| GC*A | non-GII mode; A-4 original | 1850 Hz | 1650 Hz |
| GC*B | non-GII mode; B-4 original | 1850 | 1850 |
| GC*C | non-GII mode; normal termination | 1650 | 1850 |
| GC*D | non-GII mode; talk requested | 1650 | 1650 |
| CFR*A | non-GII mode; A-4 recording sheet | 1100 | 1100 |
| CFR*B | non-GII mode; B-4 recording sheet | 1100 | 2100 |
| CFR*C | non-GII mode; normal disconnection | 2100 | 1100 |
| CFR*D | non-GII mode; talk requested | 2100 | 2100 |

In the receiver, signal GC*A or GC*B is supplied through the NCU 14 to the tonal signal receiver 17, which informs the recording unit 20 whether the original document picture to be transmitted is of A-4 or B-4 size, respectively in response to the signal GC*A or GC*B received. The recording sheet width detection circuit 21 is provided with a microswitch (not shown) for detecting whether the recording paper sheet is of A-4 or B-4 size, and the detected signal is transmitted to the recording unit 20 and the tonal signal transmitter 18, which transmits the tonal signal CFR*A or CFR*B through the NCU 14 or the telephone line 13 respectively when the recording paper sheet is of A-4 or B-4 size. In this manner the sizes of the original document and of the recording paper sheet become known to both the transmitter and the receiver. In case the receiver is not the apparatus of the present invention but is for example a conventional GII standard apparatus, there is followed the procedure shown in FIG. 1(d), in which, in response to the tonal signal GC* from the transmitter apparatus for indicating the transmission mode, the receiver apparatus again emits the tonal signal GII indicating the GII mode. In the transmitter apparatus the tonal signal receiver 7 identifies whether the received tonal signal is GI II or CFR*, and, in the case of CFR*, whether it is CFR*A or CFR*B respectively indicating the A-4 or B-4 size recording paper, and transmits the obtained information to the reading circuit 2. In case the receiver is a GII standard apparatus, the reading circuit 2 produces the picture signals with the number of bits corresponding to that in the size A-4 in the principal and auxiliary scanning directions regardless of the actual size of the original document. Thus, in case the original document is of B-4 size, the reading rate for the reading circuit 2 is so increased as to read the information of the entire width of B-4 size sheets within a time period required for the entire width of A-4 size sheets. Similarly the scanning speed per unit time in the auxiliary scanning direction is increased by auxiliary scanning means (not shown). Also, even if the receiver is an apparatus of the present invention, the information corresponding to the A-4 size is obtained by information reading in the principal and auxiliary scanning directions in the same manner in case the original document is of B-4 size whereas the recording paper sheet is of A-4 size. The picture signals emitted by reading circuit 2 in consideration of the states of the transmitter and the receiver are modulated in the MODEM 3 and supplied through the NCU 4 over the line 13. The transmitted picture signals are supplied through the NCU 14, then demodulated in the MODEM 19 and supplied to the recording device 20 for recording on an recording sheet of paper (not shown).

The procedure in the case of preliminary telephone talk request is as follows. If the receiver is in the automatic reception mode when the receiver is called by the telephone station 12, the telephone station 25 does not ring as the switch 22 is turned to the facsimile apparatus in this state. In such a case, the aforementioned signal CI is supplied from the NCU 14 of the receiver apparatus to the tonal signal transmitter 18, which in turn emits the signals CED and GI II over the line 13 through the NCU 14. In response to the signals, the tonal signal transmitter 8 of the transmitter apparatus produces, if the ringing key 9 is actuated, the signal GC*D on the line 13 through the NCU 4. Signal GC*D is received through the NCU 14 by the tonal signal receiver 17 to produce the talk request signal CFR*D from the tonal signal transmitter 18. Upon detection of the request for telephone talk in this manner by the transmitter and the receiver, the ringing generators 5 and 15 generate ringing signals to activate the loudspeakers 6 and 16 thereby generating ringing sounds. In response to the sound the operators of both parties may operate the selector switches 11, 22 to terminate the sound and to turn over the NCUs 4, 14 from the facsimile mode (picture transmission mode) to the telephone mode (talk or conversation mode), thereby enabling telephone talk through the telephone stations 12, 25. Also a telephone talk request can be reserved in the following manner. If the talk request switch 10 is actuated by the transmitting operator during the picture signal transmission, the tonal signal receiver 7 of the transmitter apparatus causes, upon reception of the signals MCF and GI II after the picture signal transmission, the tonal signal transmitter 8 to produce the signal GC*D through the NCU 4 to the line 13. The procedure thereafter follows the same as the case of the preliminary telephone talk explained in the foregoing. Also in case the talk request key 24 is actuated by the receiving operator during the picture signal reception as shown in FIG. 1(c), the receiver apparatus emits the signal GI II after the image signal transmission, and, upon receipt of the signal by the tonal signal receiver 7 of the transmitter apparatus, the tonal signal transmitter 8 produces the signal GC*, which is received, through the line 13 and the NCU 14, by the tonal signal receiver 17 to cause the tonal signal transmitter 18 to send the signal CFR*D through the NCU 14 to the line 13. Upon receipt of the signal through the NCU 4, the tonal signal receiver 7 activates the ringing generator 5 to generate a sound from the loudspeaker 6. At the same time the ringing generator 15 of the receiver is activated to generate a sound from the loudspeaker 16. The operation thereafter is the same as explained in the foregoing.

As explained in the foregoing, the facsimile apparatus of the present invention, being capable of automatically controlling the transmission of picture signals in response to sizes of an original document and of recording paper, eliminates the concern of an operator as to the size difference therebetween, and also allows transmission time to be reduced in the case of transmitting picture signals of a B-4 size original for recording on an A-4 size recording sheet of paper, in comparison with the case for recording on a B-4 size recording sheet of paper.

Also the facsimile apparatus of the present invention improves the operability in the case of telephone talk through the facsimile apparatus as it is not only provided with the functions of preliminary telephone talk and talk request reservation but also is capable of providing sound from the incorporated loudspeaker. Furthermore, the communication with the conventional GII standard apparatus can be achieved in the almost same manner as that between the GII standard machines.

What we claim is:

1. A facsimile apparatus comprising:
   original size detection means for detecting whether the size of an original document is a first size or a second size;
   reading means for reading picture information on said original document and for transmitting electrical picture signals representative of the size of said original document corresponding to either said first size or said second size;
   receiving means for receiving information indicating (i) whether a second apparatus interconnected thereto is in a specified reception mode and (ii) whether the size of a recording sheet in said second apparatus is said first size or said second size; and
   control means for (1) causing said reading means to transmit said electrical picture signals corresponding to a given size in the event that said receiving means receives information indicating that (a) said second apparatus is in said specified reception mode, and (b) said recording sheet is of said given size, and (2) for causing said reading means to transmit electrical picture signals corresponding to the smaller size of said first and second sizes in the event that said receiving means receives information indicating that (c) said second party apparatus is in said specified reception mode and (d) said recording sheet is the first size, and that said original size detection means detects the second size.

2. Facsimile apparatus comprising:
   original size detection means for detecting whether the size of an original document is a first size or a second size;
   reading means for reading picture information on said original document and for transmitting electrical picture signals representative of the size of said original document corresponding to either said first size or said second size;
   receiving means for receiving information indicating whether a second party apparatus interconnected thereto is in a first reception mode or in a second reception mode; and control means for causing said reading means to transmit electrical picture signals corresponding to said first size irrespective of the information detected by said original size detection means in the event that said receiving means receives information indicative of said first reception mode, and for causing said reading means to transmit electrical picture signals corresponding to said first or second size in response to information detected by said original size detection means in the event that said receiving means receives information indicative of said second reception mode.

3. Facsimile apparatus according to claim 2, wherein said receiving means receives information indicative of whether said recording sheet in said second party apparatus is the first size or second size in the event that said receiving means has received the information indicative of the second reception mode; and wherein said control means causes said reading means to transmit electrical picture signals corresponding to said first or second size in accordance with the size of said original document detected by said original size detection means and the size of said recording sheet received by said receiving means.

4. Facsimile apparatus comprising:
receiving means for receiving electrical picture signals or prescribed information;
recording means for recording said picture signals received by said receiving means on a recording sheet;
recording sheet size detection means for detecting whether said recording sheet is a first size or second size; and
information generating means for generating information indicative of a first reception mode responsive to the prescribed information received by said receiving means and for generating information indicative of a second reception mode and information indicative of the size of said recording sheet detected by said recording sheet size detection means.

5. Facsimile apparatus comprising:
calling means for establishing a telephone connection to a second party apparatus;
reading means for converting picture information of an original document into electrical picture signals and for generating picture signals therefrom;
preparatory telephone command means for generating a command requesting the establishment of the telephone call to said second party apparatus; and
calling signal output means for generating a prescribed calling signal prior to sending said picture signals in response to said command from said preparatory telephone command means during a time when the telephone connection has been established to said second party apparatus.

6. Facsimile apparatus according to claim 5, further comprising receiving means for receiving a prescribed calling signal from said second party apparatus; and
audio signal output means for converting the calling signal received from said second party apparatus into an audio signal output.

7. Facsimile apparatus comprising:
recording means for recording received picture signals on a recording sheet;
preparatory telephone command means for generating a request for establishment of a telephone call to a second party apparatus; and
calling signal output means for generating a prescribed calling signal prior to recording said picture signals on said recording sheet in response to said command from said preparatory telephone command means during a time when a telephone connection has been established to said second party apparatus.

8. Facsimile apparatus according to claim 7, further comprising receiving means for receiving a prescribed calling signal from said second party apparatus; and
audio signal output means for converting the calling signal received by said receiving means into an audio signal.

9. Facsimile apparatus comprising:
calling means for establishing a telephone connection to a second party apparatus;
reading means for converting electrical picture information on an original document into electrical picture signals and for transmitting said picture signals;
telephone reservation command means for generating a request for establishment of a telephone call to said second party apparatus; and
signal output means for generating a prescribed calling signal after transmission of said picture signals in response to the presence of said request from said telephone reservation command means and for generating another signal in response to the absence of said request from said telephone reservation command means during a time when said telephone connection has been established to said second party apparatus by said calling means and when said picture signals have been transmitted by said reading means.

10. Facsimile apparatus according to claim 9, further comprising receiving means for receiving a calling signal from said second party apparatus, and audio signal output means for converting the calling signal received by said receiving means into an audio output signal.

11. Facsimile apparatus comprising:
recording means for recording received picture signals on a recording sheet;
telephone reservation command means for generating a request for establishment of a telephone call to a second party apparatus; and
signal output means for transmitting a prescribed calling signal after recording the picture signals in response to the presence of said request from said telephone reservation command means and for generating another signal in response to the absence of said request from said telephone reservation command means during a time when a telephone connection has been established to said second party apparatus and when the picture signals have been recording by said recording means.

12. Facsimile aparatus according to claim 11, further comprising receiving means for receiving a prescribed calling signal from said second party apparatus; and
audio signal output means for converting the calling signal received by said receiving means into an audio signal.

13. Facsimile apparatus according to claim 9 or 11, wherein the prescribed calling signal transmitted by said signal output means comprises a signal that maintains the telephone call established to said second party apparatus even after completion of generating or receiving the picture signals.

14. Facsimile apparatus according to claim 9 or 11, wherein the other signal transmitted by said signal output means comprises a signal that disconnects the telephone call established to said second party apparatus after completion of transmitting or receiving the picture signals.

* * * * *